US010478840B2

(12) United States Patent
Khan et al.

(10) Patent No.: US 10,478,840 B2
(45) Date of Patent: Nov. 19, 2019

(54) APPARATUS AND METHOD FOR CONVERTING LIQUID STREAM INTO FINE DROPLETS

(71) Applicant: INDIAN OIL CORPORATION LIMITED, Mumbai (IN)

(72) Inventors: Shoeb Hussain Khan, Faridabad (IN); Venkata Hari Prasad Gupta Bandaru, Faridabad (IN); Jagdev Kumar Dixit, Faridabad (IN); Gautam Thapa, Faridabad (IN); Satheesh Vetterkunnel Kumaran, Faridabad (IN); Debasis Bhattacharyya, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 143 days.

(21) Appl. No.: 15/914,909

(22) Filed: Mar. 7, 2018

(65) Prior Publication Data
US 2019/0001353 A1    Jan. 3, 2019

(30) Foreign Application Priority Data
Jun. 28, 2017    (IN) .............................. 201721022573

(51) Int. Cl.
*B05B 7/04* (2006.01)
*B05B 7/10* (2006.01)
(Continued)

(52) U.S. Cl.
CPC .......... *B05B 7/0491* (2013.01); *B01F 3/0446* (2013.01); *B01F 3/04056* (2013.01);
(Continued)

(58) Field of Classification Search
CPC ..... B05B 7/0408; B05B 7/045; B05B 7/0475; B05B 7/04; B05B 7/06; B05B 7/10; B05B 7/0491; B01F 3/04056; B01F 3/0446
(Continued)

(56) References Cited

U.S. PATENT DOCUMENTS 4,434,049 A    2/1984  Dean et al.
5,037,616 A    8/1991  Williatte et al.
(Continued)

FOREIGN PATENT DOCUMENTS

WO    2012/041782 A1    5/2014

*Primary Examiner* — Steven J Ganey
(74) *Attorney, Agent, or Firm* — Maschoff Brennan

(57) ABSTRACT

An apparatus and a method for mixing and atomizing a hydrocarbon stream is disclosed. The apparatus comprises of an inner conduit having a first inlet for receiving the hydrocarbon stream, and a second inlet for receiving a primary dispersion stream. The inner conduit produces a primary mixture comprising the hydrocarbon stream and the primary dispersion stream. The apparatus further includes an outer conduit having a third inlet for receiving a secondary dispersion stream. Further, said inner and outer conduits together define an annular passage. The distal end of the annular passage defines a second set of orifices for allowing the secondary dispersion stream flowing there-through to come in contact with the primary mixture and thereby dispensing the secondary mixture so obtained through an outlet.

7 Claims, 5 Drawing Sheets

(51) Int. Cl.
*B05B 7/06* (2006.01)
*B01F 3/04* (2006.01)

(52) U.S. Cl.
CPC ............. *B05B 7/04* (2013.01); *B05B 7/045* (2013.01); *B05B 7/0408* (2013.01); *B05B 7/0475* (2013.01); *B05B 7/06* (2013.01); *B05B 7/10* (2013.01)

(58) Field of Classification Search
USPC ........ 239/8, 398, 423, 424, 424.5, 429, 430, 239/433, 403
See application file for complete search history.

(56) References Cited

U.S. PATENT DOCUMENTS

| | | | |
|---|---|---|---|
| 5,240,183 A | 8/1993 | Bedaw et al. | |
| 5,810,252 A * | 9/1998 | Pennamen | B05B 7/0441 |
| | | | 239/423 |
| 6,142,457 A | 11/2000 | Holtan et al. | |
| 6,691,928 B2 * | 2/2004 | Chung | F23D 11/102 |
| | | | 239/433 |
| 6,827,299 B2 * | 12/2004 | Scotchmur | B05B 7/066 |
| | | | 239/433 |
| 8,590,812 B2 * | 11/2013 | Wurz | F23D 11/102 |
| | | | 239/424 |

* cited by examiner

APPARATUS AND METHOD FOR CONVERTING LIQUID STREAM INTO FINE DROPLETS

FIELD OF THE INVENTION

The present invention generally relates to an atomizing process for a hydrocarbon feed. In particular, the present invention relates to an apparatus for atomizing a heavy hydrocarbon stream.

BACKGROUND OF THE INVENTION

Fluid catalytic cracking (FCC) process is employed in petroleum refineries to convert high-boiling hydrocarbon fractions of crude oil to more valuable products such as Liquefied Petroleum Gas (LPG), Gasoline and Diesel. For this, heavy crude oil is chemically broken down into lighter hydrocarbon fractions having a comparatively smaller chain of carbon atoms with the help of one or more catalysts. These high boiling hydrocarbon fractions are then introduced, in multiple streams, into a reactor section to undergo catalytic cracking. This results in lighter hydrocarbon fractions, which are further sent to a fractional distillation column for recovering aforementioned valuable products.

In the FCC process, to minimize the time involved in catalytic cracking, a liquid hydrocarbon stream is vaporized inside the riser reactor to get completely diffused into the pores of the catalyst(s) used. To facilitate this vaporization process, the liquid hydrocarbon stream or the hydrocarbon feed is first atomized. The atomization process, conducted in an atomizer, also referred to as a 'feed nozzle assembly', refers to the breaking of a hydrocarbon feed of a given volume into a number of fine droplets to increase the surface area of the hydrocarbon feed with respect to its own initial volume. Also, the hydrocarbon feed is subjected to high temperature during the atomization process which may alter certain physical properties of the hydrocarbon stream, such as viscosity. This further enhances the atomization of the hydrocarbon stream.

The atomization of the hydrocarbon feed is very critical for contacting the hydrocarbon feed with catalyst particles involved in the catalytic cracking. If the feed is introduced without proper atomization, the contact of the feed droplets and catalyst particles will be poor and the heat transfer from the hot catalyst particle to the feed will be less, resulting in low vaporization of feed. Therefore, the hydrocarbon feed is required to be atomized into fine droplets which are of similar sizes of catalyst particles. This essentially helps to increase the contact of feed with the catalyst particles and the transfer of heat from the catalyst to feed for faster vaporization. Conventional atomizers, however, fall short in completely and efficiently atomizing a heavy hydrocarbon feed that is extremely viscous and having very high surface tension. In-efficient atomization leads to non-uniformity in terms of diameter and velocity of the droplets of the atomized hydrocarbon feed. Moreover, it may take considerable time for such hydrocarbon feeds to vaporize, which, in turn, leads to slow and inadequate absorption of heat by the hydrocarbon droplets inside the riser reactor employed during the FCC process.

U.S. Pat. No. 6,142,457 describes a nozzle for atomizing a hydrocarbon feed that is to be catalytically cracked in a commercial FCC unit. The nozzle as disclosed includes a primary conduit for receiving a liquid stream, i.e., the hydrocarbon feed and a secondary conduit for receiving a dispersion medium. The dispersion medium and liquid stream are combined in a mixing zone that is located between the outlet of the secondary conduit and the outlet of the primary conduit. In the mixing zone, the primary conduit inner surface is gradually tapered so the cross-sectional area of the primary conduit outlet is decreased relative to the cross-sectional area of the primary conduit inlet so as to form a liquid film which is atomized as it exits the primary conduit's outlet.

U.S. Pat. No. 4,434,049 is directed to an oil-water emulsion atomizer which is discharged into up flowing dispersed phase catalyst particles at velocities up to sonic velocities to form a suspension under hydrocarbon conversion conditions. The injection devices disclosed in this patent rely on high fluid velocities and high pressure drops to achieve atomization of the oil into fine droplets.

U.S. Pat. No. 5,037,616 teaches that the dispersion of the feed with vapor may be obtained with the aid of a feed injector featured by a venturi tube. Dimensions characterize the geometry of this device such that the speed of the feed and steam mixture reaches sonic conditions at the venture throat. On its turn, the venturi tube shows a cylindrical internal section and is situated between the converging and diverging sections.

U.S. Pat. No. 5,240,183 discloses an atomizing spray nozzle for mixing and atomizing various liquid and gas combinations includes a central liquid conduit, an annular gas passage disposed concentrically about the liquid conduit, a helical spray member, and a spray head. The spray head provides a chamber for the mixing of the gas and liquid and for the discharge of the resulting mixture through the orifice of the head to form an atomized spray. The most common method to produce such a spray pattern is to dispose an elliptical or rectangular orifice at the tip or discharge end of the spray head.

WO2012/041782 teaches the feed nozzle assembly for co-currently introducing gas and liquid into a reactor vessel which feed nozzle assembly comprises (a) an inner tube defining a gas conduit and an outer tube arranged around the inner tube, wherein the outer surface of the inner tube and the inner surface of the outer tube define an annular liquid conduit, and wherein each of the tubes have an inlet end and an opposite outlet end; (b) a first nozzle attached to the outlet end of the inner tube; (c) a second nozzle attached to the outlet end of the outer tube and arranged downstream of the first nozzle, wherein the inner tube contains purging orifices.

Typically, the feedstock used in FCC process is the vacuum gas oil which has a boiling point above 370° C. and CCR (Conradson Carbon Residue) in the range of 0.5 wt. %. In order to derive maximum economic benefit, nowadays, residue feedstocks with higher CCR are also being processed in FCC. If the hydrocarbon feed is a heavy residue such as vacuum residue with viscosity of more than 200 cSt @ 100° C., the atomization becomes more difficult due to its higher viscosity & surface tension, which is one of the major drawbacks of the prior arts.

In view of the above-stated drawbacks, there is a need for an apparatus and a process capable of atomizing a high viscosity hydrocarbon feedstock such as a vacuum residue.

SUMMARY OF THE INVENTION

The present invention as embodied and broadly described herein discloses an apparatus and a method for mixing and atomizing a hydrocarbon feedstock. The hydrocarbon feedstock also referred to as the 'hydrocarbon stream', may be of a high viscosity such as a vacuum residue. The apparatus as proposed in the present invention may comprise of at least an internal flow section which enhances the mixing of a heavy hydrocarbon feedstock with at least one dispersion media. The resultant mixing achieved through the apparatus of the present invention results in high levels of atomization and also a reduction in the viscosity and the surface tension of the hydrocarbon stream. Further, the apparatus as proposed includes an outlet at the tip of the apparatus. The construction of the outlet as proposed enables very fine droplets of the atomized hydrocarbon feed to be discharged into a reactor of the FCC unit.

Accordingly, an aspect of the present invention is to provide an apparatus for mixing and atomizing a hydrocarbon stream using a dispersion stream, where the apparatus comprises of at least an inner conduit having a first inlet and a second inlet, where the first inlet of the inner conduit is for receiving the hydrocarbon stream, and the second inlet is for receiving a primary dispersion stream. The inner conduit may produce a primary mixture comprising the hydrocarbon stream and the primary dispersion stream. Further, the second inlet for receiving the primary dispersion stream may include a first axial pipe and at least one further axial pipe connected in a direction of flow of the primary dispersion stream. The first axial pipe may be adapted to receive the primary dispersion stream. Further, the second axial pipe may define a first set of orifices for the exit of the primary dispersion stream thereto. The first set of orifices may be located at the same horizontal plane as that of the first inlet. Further, the apparatus may comprise of an outer conduit having a third inlet for receiving a secondary dispersion stream, said inner and outer conduits together defining an annular passage for the downstream flow of the secondary dispersion stream. The apparatus further comprises a distal end of the annular passage defining a second set of orifices for allowing the secondary dispersion stream flowing therethrough to come in contact with the primary mixture and to thereby form a secondary mixture. The apparatus further comprises of an outlet for dispensing the secondary mixture comprising the hydrocarbon, the primary dispersion stream, and the secondary dispersion stream.

Another aspect of the present invention is to provide a method of mixing and atomizing a hydrocarbon stream using a dispersion stream. The method may comprise of providing an apparatus for mixing and atomizing a hydrocarbon stream using a dispersion stream, where the apparatus comprises of at least an inner conduit, an outer conduit, a distal end, and an outlet. The inner conduit may comprise of a first inlet for receiving the hydrocarbon stream and a second inlet for receiving primary dispersion stream. Said second inlet for receiving primary dispersion stream may include a first axial pipe and at least one further axial pipe connected in a direction of flow of the primary dispersion stream. The outer conduit may have a third inlet for receiving a secondary dispersion stream, said inner and outer conduits together defining an annular passage for the downstream flow of the secondary dispersion stream. The method as disclosed comprises of introducing the hydrocarbon stream into the first inlet of the inner conduit, introducing the primary dispersion stream into the second inlet of the inner conduit, and introducing the secondary dispersion stream into the third inlet of the outer conduit.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

Figure 1:
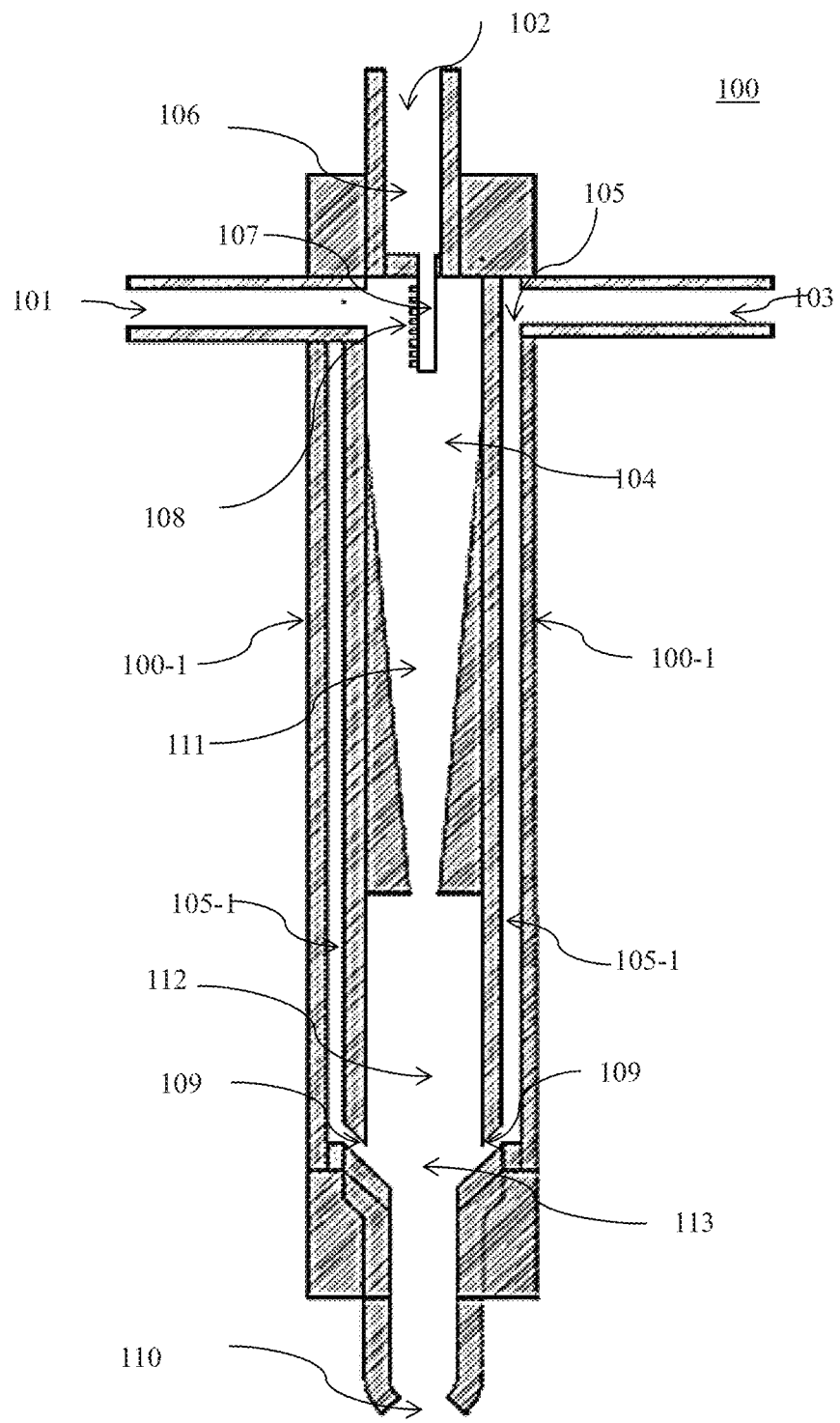
FIG. 1 illustrates a schematic view of an apparatus for mixing and atomizing a hydrocarbon stream, in accordance with an embodiment of the present invention.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present invention. Furthermore, in terms of the construction of the device, one or more components of the device may have been represented in the drawings by conventional symbols, and the drawings may show only those specific details that are pertinent to understanding the embodiments of the present invention so as not to obscure the drawings with details that will be readily apparent to those of ordinary skill in the art having benefit of the description herein.

DETAILED DESCRIPTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" are defined as meaning "no embodiment, or one embodiment, or more than one embodiment, or all embodiments."

The terminology and structure employed herein is for describing, teaching and illuminating some embodiments and their specific features and elements and does not limit, restrict or reduce the scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

Reference is made herein to some "embodiments." It should be understood that an embodiment is an example of a possible implementation of any features and/or elements presented in the attached claims. Some embodiments have been described for the purpose of illuminating one or more of the potential ways in which the specific features and/or elements of the attached claims fulfill the requirements of uniqueness, utility, and non-obviousness.

Use of the phrases and/or terms such as but not limited to "a first embodiment," "a further embodiment," "an alternate embodiment," "one embodiment," "an embodiment," "multiple embodiments," "some embodiments," "other embodiments," "further embodiment", "furthermore embodiment", "additional embodiment" or variants thereof do NOT necessarily refer to the same embodiments. Unless otherwise specified, one or more particular features and/or elements described in connection with one or more embodiments may be found in one embodiment, or may be found in more than one embodiment, or may be found in all embodiments, or may be found in no embodiments. Although one or more features and/or elements may be described herein in the context of only a single embodiment, or alternatively in the context of more than one embodiment, or further alternatively in the context of all embodiments, the features and/or elements may instead be provided separately or in any appropriate combination or not at all. Conversely, any features and/or elements described in the context of separate embodiments may alternatively be realized as existing together in the context of a single embodiment.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

In accordance with an embodiment of the present invention, an apparatus for mixing and atomizing a hydrocarbon stream using a dispersion stream is disclosed. 'Apparatus' as used herein includes a feed-injector also known as a feed-nozzle assembly to be used in a Fluid Catalytic Cracking (FCC) process. An outlet provided for the present apparatus allows the flow of an atomized hydrocarbon stream into a reactor of an FCC unit where the FCC process is being carried out using one or more catalysts, as known in the art.

In accordance with an embodiment of the present invention, one or more dispersion streams or a diluent stream may be used for mixing with the hydrocarbon stream in the disclosed apparatus. The dispersion stream may include a diluent which generally includes steam, nitrogen, fuel gas, subcooled water, and various steam of naphtha, such as coker naphtha, straight run naphtha, visbreaker naphtha, and other suitable diluent/dispersion medium known in the art. In the present invention, a dispersion stream which enters the disclosed apparatus from a second inlet may be referred to as 'primary dispersion stream' and a dispersion stream which enters the disclosed apparatus from a third inlet may be referred to as 'secondary dispersion stream'. However, it should be understood that the primary dispersion stream and the secondary dispersion stream may include the same dispersion stream/diluent stream, or may be selected to be different dispersion streams/diluent streams.

Further, the hydrocarbon stream which may be atomized in the disclosed apparatus may include an entire range of liquid petroleum fractions which will include coker naphtha, coker gas oil, Vacuum Gas Oil (VGO), hydrotreated vacuum gas oil (VGO), hydrocracker bottom, straight run naphtha, visbreaker naphtha, vacuum residue (VR), vacuum residue tar (VR tar), reduced crude oil (RCO) and combination thereof. In accordance with one embodiment, the hydrocarbon stream includes a high viscous hydrocarbon feedstock such as VR having a viscosity more than 200 cSt @ 100° C. and surface tension in the range of 40 dyne/cm. However, the apparatus may also be used to atomize other liquid streams which are to be processed using catalytic cracking conversion in the FCC units.

In accordance with an embodiment of the present invention, the hydrocarbon stream is atomized at different stages within the apparatus. In accordance with a preferred embodiment, the hydrocarbon stream is atomized in at least two stages. However, more than two stages may be construed from the foregoing description of the mixing process of the hydrocarbon stream with the dispersion mediums within the disclosed apparatus, and the dispensing process of the atomized hydrocarbon stream from an outlet of the disclosed apparatus.

The first stage may include mixing of the hydrocarbon stream with the primary stream as the atomizing media so as to produce a primary mixture. In a preferred embodiment, the apparatus as disclosed provides a construction of axial pipes that facilitates the mixing of the hydrocarbon stream with the primary stream thus enabling the first stage of atomization.

Further, the second stage may include mixing of the primary mixture with the secondary stream as the atomizing media so as to produce a further atomized mixture. In a preferred embodiment, the apparatus as disclosed provides a construction within the apparatus which may be in proximity towards the outlet of the apparatus, the construction as such provided facilitates the mixing of the primary mixture with the secondary stream, thus enabling the second stage of atomization.

In accordance with a further embodiment of the present invention, the apparatus may also include a construction of the outlet which may be located at the tip of the apparatus that facilitates introducing adequately atomized hydrocarbon stream into the reactor of the FCC unit.

The present apparatus efficiently atomizes a high viscous hydrocarbon feed such as VR into fine droplets. In addition, the apparatus as disclosed in the foregoing descriptions enables maintaining sufficient pressure drop across all sections that allow thorough mixing of the viscous hydrocarbon stream as well as during the supply of the atomized hydrocarbon stream into the reactor of the FCC unit. By way of an example, a gradual contraction and a sudden expansion zone provided within the apparatus introduces high pressure drop that enhances the mixing of the hydrocarbon stream with the dispersion medium, while the outlet end located at the tip of the apparatus may include a set of orifices so as to introduce fine droplets in a form of flat spray into the FCC unit.

FIG. 1 illustrates a schematic view of an apparatus 100 for mixing and atomizing a hydrocarbon stream using a dispersion stream, in accordance with an embodiment of the present invention. As illustrated, the apparatus 100 comprises at least a first inlet 101, a second inlet 102, a third inlet 103 and an outlet 110. Further, within a housing 100-1 of the apparatus 100, an inner conduit 104 and an outer conduit 105 is defined.

In particular, inner conduit 104 is defined by the walls of the first inlet 101 entering the housing 100-1 of the apparatus 100, and the walls of the second inlet 102 entering the housing 100-1 of the apparatus 100. Further, the inner conduit 104 extends down towards the outlet 110 in a direction of flow of a primary mixture obtained in the inner conduit 104. As illustrated, the inner conduit 104 includes the first inlet 101 and the second inlet 102. Although the first inlet 101 and the second inlet 102 are illustrated to be in a perpendicular relation to each other, the first inlet 101 and the second inlet 102 may also be defined at an angle other than 90 degrees.

The first inlet 101 receives the hydrocarbon stream and the second inlet 102 receives the primary dispersion stream which acts as the primary atomizing media for the hydrocarbon stream. Within the inner conduit 104, the primary dispersion stream intersects the hydrocarbon stream to form the primary mixture. The primary dispersion stream is introduced through the second inlet 102 in the form high-speed jets which may impinge the hydrocarbon stream in a direction parallel to the flow of hydrocarbon stream coming from the first inlet 101. This may result in the initial break-up of the heavy hydrocarbon stream. In the present disclosure, this stage may also be referred to as the first stage of atomization.

Figure 2:
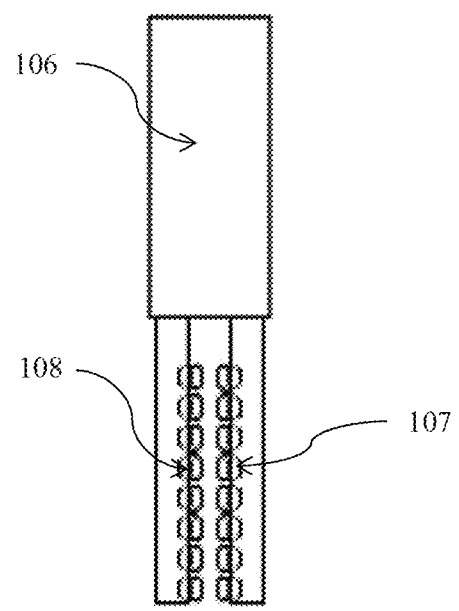
FIG. 2 illustrates a schematic view of the construction of axial pipes provided in one of the inlets of an apparatus for mixing and atomizing a hydrocarbon stream, in accordance with an embodiment of the present invention.

In accordance with another embodiment, the second inlet 102 which receives the primary dispersion stream may be formed of at least a first axial pipe and at least one further axial pipe. An enlarged view of the construction of a second inlet pipe 102 is shown in FIG. 2. As illustrated in FIG. 2, a second inlet pipe 102 for receiving the primary dispersion stream includes a first axial pipe 106 and at least one further axial pipe 107 connected in a direction of flow of the primary dispersion stream. Further, the axial pipe 107 may define a first set of orifices 108 where the primary dispersion media as received by the first axial pipe 106 is passed through the first set of orifices 108 located within the further axial pipe 107. The first set of orifices 108 may be located and directed towards the first inlet 101. As such, the primary dispersion stream exits through the first set of orifices 108 in form of multiple streams which impinges the hydrocarbon stream introduced through the first inlet pipe 101.

According to an aspect of the present invention, the first set of orifices 108 may be located at the same horizontal plane as that of the first inlet 101. In one implementation, the first set of orifices 108 may be arranged in a two-dimensional matrix. However, other arrangements of the first set of orifices 108 may also be contemplated without departing from the scope of the present invention. The first set of orifices 108 being located at the same horizontal plane as that of the first inlet may direct the primary dispersion stream in a direction substantially parallel to a direction of flow of the hydrocarbon stream from the first inlet 101 into the inner conduit 104, to obtain the primary mixture of the hydrocarbon stream and the primary dispersion stream. Accordingly, the first set of orifices 108 may be located in a plane with respect to the flow of direction of the hydrocarbon stream from the first inlet 101 such that the primary dispersion stream is directed in a direction so as to intersect the flow of the hydrocarbon stream in the inner conduit.

Further, as illustrated in FIG. 1, the inner conduit 104 may further define a gradual contraction zone 111 and sudden expansion zone 112 located downstream of the flow of the primary mixture towards the outlet 110, for contracting and expanding the primary mixture. The primary mixture as formed during the first stage of atomization as disclosed above moves into the contraction zone 111 and the expansion zone 112 where the cross-section of the flow path of the primary mixture is gradually reduced and then suddenly increased within the inner conduit 104 so as to control the acceleration of the flow of the primary mixture. In one implementation, the contraction zone 111 and sudden expansion zone 112 may include a tapered contraction member (not shown). In one such implementation, the tapered contraction member may include a tapered section that continuously decreases the cross-section of the flow path of the primary mixture and then increase the cross-section of the flow path to the full diameter of the inner conduit 104 defined within the apparatus 100. In yet another implementation, the length of the contraction zone 111 and sudden expansion zone 112 may be at least half a length of the inner conduit 104.

Further, as illustrated in FIG. 1, the outer conduit 105 of the apparatus 100 may be defined by the walls of the third inlet 103 entering the housing 100-1 of the apparatus 100, and a portion of the housing 100-1 which lies circumscribing the inner conduit 104 defined within the housing 100-1. The secondary dispersion stream is received by the third inlet 103 and further flows through an annular passage 105-1 defined by the outer conduit 105 circumscribing the inner conduit 104 defined within the housing 100-1 of the apparatus 100. It may be understood that the inner conduit 104 and the outer conduit 105 circumscribing the inner conduit 104 together defining the annular passage 105-1 for downstream flow of the secondary dispersion stream. The secondary dispersion stream flowing there-through the annular passage 105-1 flows downwards to come in contact with the primary mixture and thereby form a secondary mixture. This may result in further atomization facilitating break-up of the hydrocarbon particles present in the primary mixture. In the present disclosure, this stage may also be referred to as the second stage of atomization.

Figure 3:
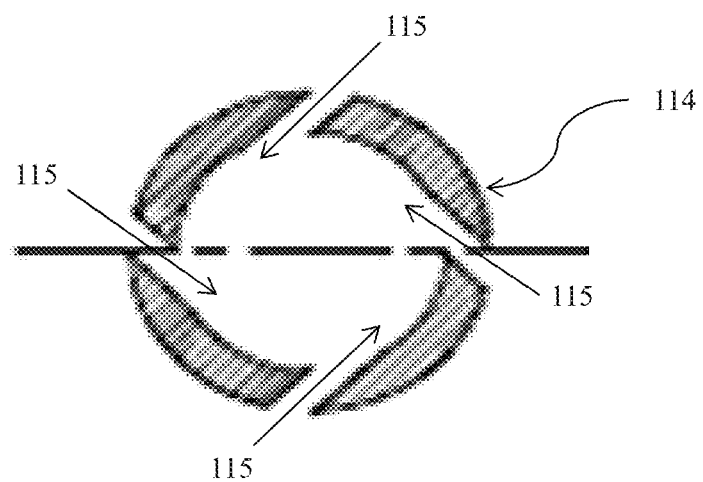
FIG. 3 illustrates a cross-sectional view of the construction of a distal end of an annular passage defined within an apparatus for mixing and atomizing a hydrocarbon stream, in accordance with an embodiment of the present invention.
Figure 4:
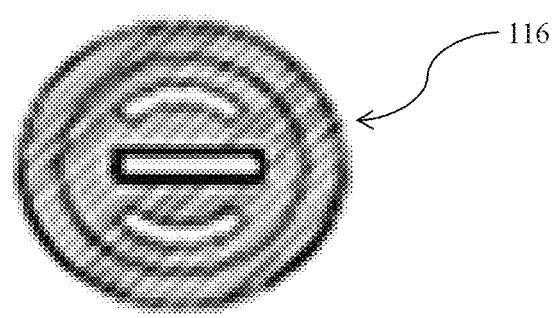
FIG. 4 illustrates a construction of an outlet of an apparatus for mixing and atomizing a hydrocarbon stream, in accordance with an embodiment of the present invention.
Figure 5:
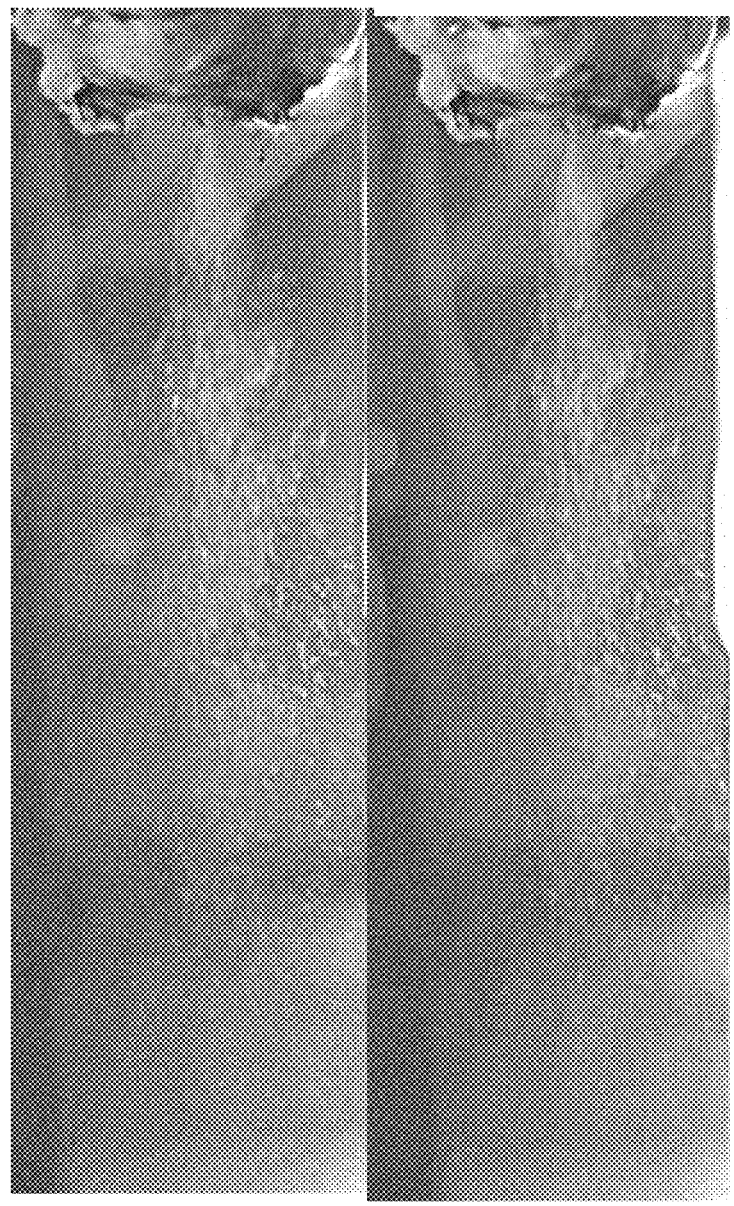
FIGS. 5 and 6 illustrate an experiment-based spray pattern of an atomized hydrocarbon stream obtained from an apparatus for mixing and atomizing a hydrocarbon stream, in accordance with an embodiment of the present invention.
Figure 6:
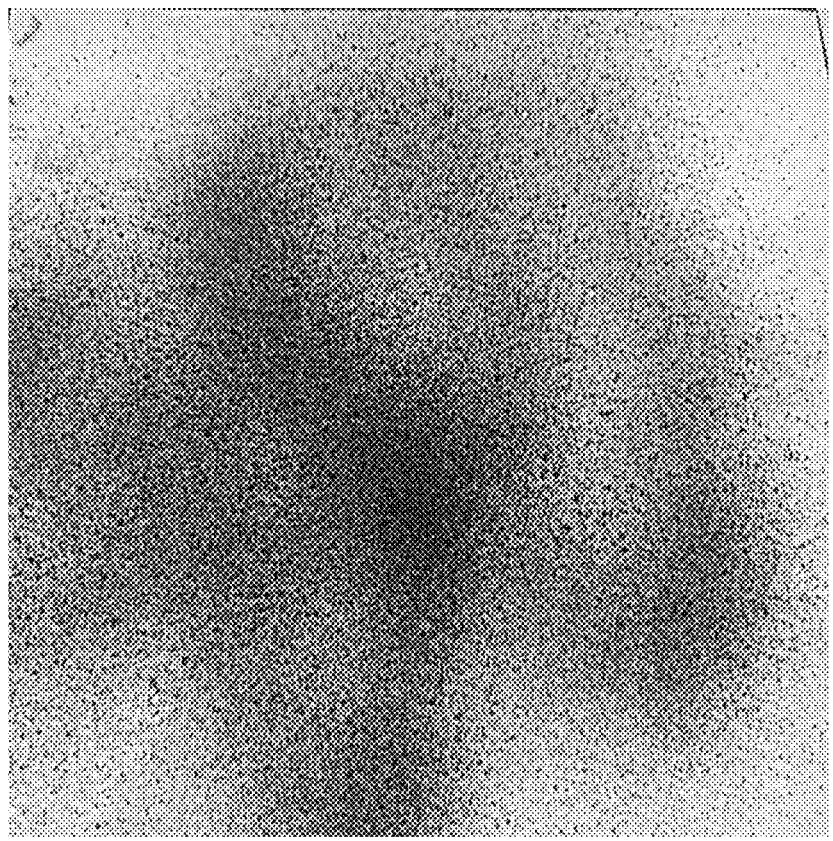

In accordance with another embodiment, a distal end 109 of the annular passage 105-1 may define a second set of orifices for the exit of the secondary dispersion stream into a region 113 which lies in the extended region of the inner conduit 104 towards the outlet 110 in a direction of flow of the primary mixture. FIG. 3 illustrates a cross-sectional view of the distal end 109 of the annular passage 105-1 which includes a second set of orifices 114 in the form of four grooves cut-through the annular passage 105-1 at the distal end 109. Although the second set of orifices 114 have been illustrated in the form of four cut-through grooves, it should not be construed as limiting to the present invention and more or fewer than four orifices 114 may also be contemplated without departing from the scope of the present invention. In another implementation, the second set of orifices may not be in the form of cut-through groves in the annular passage 105-1 of the outer conduit 105 but may be in the form of grooves cut in a disc introduced in the region 113 of the apparatus 100.

Further, as illustrated in FIG. 3, the second set of orifices, i.e., the grooves, 114 enables ejection of the secondary dispersion medium at a high velocity to intersect the primary mixture at the region 113 so as to form the secondary mixture. Additionally, due to the grooves 114 as illustrated in FIG. 3, a swirl motion, indicated by flow-direction 115, may be created in the region 113 as the secondary dispersion stream ejects the outer conduit 105 and intersects the primary mixture to form the secondary mixture, thus enhancing the mixing of the primary mixture and the secondary dispersion stream, and further atomization of the hydrocarbon stream at a high velocity. Accordingly, an aspect of the present invention is to provide the second set of orifices to direct the secondary dispersion stream so as to be tangential to an imaginary circle.

Further, as illustrated in FIG. 1, the outlet 110 allows dispensing the secondary mixture which comprises of the hydrocarbon stream, the primary dispersion stream, and the secondary dispersion stream. In accordance with one embodiment, the secondary mixture may be discharged from the outlet 110 in the form of flat-spray including finer droplets of the atomized hydrocarbon feed to be introduced into the reactor of the FCC unit. According to one implementation, the flat-spray of the secondary mixture may be obtained by introducing a slot-plate at the tip of the outlet 110. The slot-plate may include one or more straight slots or one or more curved slots on both sides of the slot-plate. By way of one example, FIG. 4 illustrates a slot plate 116 include one straight slot and two curved slots for obtaining flat fan spray of the atomized hydrocarbon stream, i.e., the secondary mixture being ejected from the outlet 110 of the apparatus 100. In accordance with a further embodiment of the present invention, the tip of the outlet 110 may be employed in varying size and shapes in accordance with a desired flow-rate of the ejected stream. In one embodiment, the size and the shape as employed for the tip of the outlet 110 may be dependent upon the flow rate of the hydrocarbon stream and the dispersion media, the top pressure of the riser of the FCC unit, etc.

In accordance with the above-described embodiments, a method of mixing and atomizing a hydrocarbon stream is disclosed. During operation, the hydrocarbon stream is pre-heated and introduced into the apparatus 100 via the inlet 101 and the diluent/dispersion stream(s) is pre-heated and introduced into the apparatus 100 via the inlets 102 and 103 respectively. The primary dispersion stream introduced through the second inlet 102 flows through the first axial pipe 106 and further through the first set of orifices 108 present in the further axial pipe 107 to intersect the hydrocarbon stream introduced through the first inlet 101. The primary dispersion stream mixes with the hydrocarbon stream in the inner conduit 104 to form a primary mixture in the inner conduit 104. In particular, there is an instant break-up of the heavy hydrocarbon stream as it enters into the inner conduit 104 through the first inlet 101 and comes in contact with the primary dispersion stream that is coming out of the second inlet 102. The hydrocarbon stream further mixes and breaks up in gradual contraction and a sudden expansion zone inside the inner conduit 104. This design of the inner conduit of the present invention facilitates the breakage of a hydrocarbon stream in the primary mixture when it will pass through the contraction zone 111 and expansion zone 112. Thereafter, a secondary dispersion stream is introduced downstream of the contraction zone 111 and the expansion zone 112 to further enhance the mixing and breakup of the hydrocarbon stream. The secondary diluent/dispersion stream is thereby mixed with the primary mixture coming from the inner conduit 104 to further break the hydrocarbon stream and in turn to form a secondary mixture. As already stated, the second set of orifices may direct the secondary dispersion stream tangentially to an imaginary circle and thereby produce a swirling action of the secondary dispersion stream. The dispensing of secondary dispersion stream in such manner into the primary mixture further reduces the droplet size of the heavy hydrocarbon present therein. Thus the size of the heavy hydrocarbon is progressively reduced. The outlet 110 for the primary dispersion stream and the secondary dispersion stream from the outlet may include a slot-plate including slots on both sides (for e.g., the slot-plate as shown in FIG. 4) for obtaining flat fan spray which facilitates the high velocity of the outgoing mixture and further contributes to formation of smaller size droplets of the liquid hydrocarbon feed present within the mixture. It is to be understood that the diluent/dispersion stream can be divided into a plurality of portions and can be introduced into the mixture at different stages. Each time a portion of the diluent/dispersion stream is introduced into the mixture, the viscosity of the mixture is progressively reduced.

FIG. 5 illustrates a spray pattern captured through the high-speed camera where the spray pattern was obtained from an experiment conducted on a prototype of the apparatus as disclosed in accordance with an embodiment of the present inventions. The prototype of the apparatus used for the experiment had an outer diameter (OD) of about 1.5 inches in which a heavy hydrocarbon feed was injected for testing. In one example, vacuum residue of CCR 21.2 wt % was used as a heavy hydrocarbon feed and nitrogen as a dispersion stream. The feedstock properties used in the experiment are indicated in Table-1 below.

TABLE 1

| Name | VR |
|---|---|
| CCR, wt % | 21.2 |
| Density, gm/cc | >1.03 |
| KV, cSt (At 100° C.) | 234.2 |
| Sim Dist, D-2887 | (° C.) |
| IBP | 233 |
| 5 | 426 |
| 10 | 458 |
| 30 | 522 |
| 50 | 580 |
| 75 | 638 |
| 90 | 678 |
| 95 | 695 |
| FBP | 723 |

FIG. 6 further depicts the atomized spray obtained through the above-stated experiment as collected on a white paper. Based at least on visual observations depicted in FIGS. 5 and 6, it may be concluded that the apparatus as proposed in the present invention is capable to produce fine droplets of a high viscous hydrocarbon feed such as vacuum residue.

While specific language has been used to describe the disclosure, any limitations arising on account of the same are not intended. As would be apparent to a person in the art, various working modifications may be made to the method in order to implement the inventive concept as taught herein. The scope of the embodiments is by no means limited by these specific examples. The scope of the embodiments is at least as broad as given by the following claims.

We claim:

1. An apparatus for mixing and atomizing a hydrocarbon stream using a dispersion stream, said apparatus comprising:
   an inner conduit having a first inlet for receiving the hydrocarbon stream and a second inlet for receiving a primary dispersion stream, the inner conduit producing a primary mixture comprising the hydrocarbon stream and the primary dispersion stream;
   said second inlet for receiving the primary dispersion stream including a first axial pipe and at least one further axial pipe connected in a direction of flow of the primary dispersion stream, the first axial pipe being adapted to receive the primary dispersion stream and the second axial pipe defining a first set of orifices for exit of the primary dispersion stream thereto, the first set of orifices being located at the same horizontal plane as that of the first inlet;
   an outer conduit having a third inlet for receiving a secondary dispersion stream, said inner and outer conduits together defining an annular passage for downstream flow of the secondary dispersion stream;
   a distal end of the annular passage defining a second set of orifices for allowing the secondary dispersion stream flowing there-through to come in contact with the primary mixture and to thereby form a secondary mixture; and
   an outlet for dispensing the secondary mixture comprising the hydrocarbon stream, the primary dispersion stream and the secondary dispersion stream.

2. The apparatus as claimed in claim 1, wherein the inner conduit defines at least one contraction and expansion zone located within the inner conduit, said contraction and expansion zone located downstream of the first and the second inlets for contracting and expanding the primary mixture.

3. The apparatus as claimed in claim 1, wherein the first set of orifices is arranged in form of a two-dimensional matrix.

4. The apparatus as claimed in claim 1, wherein the first set of orifices direct the primary dispersion stream in a direction parallel to a direction of flow of the hydrocarbon stream from the first inlet.

5. The apparatus as claimed in claim 1, wherein the first set of orifices direct the primary dispersion stream in a direction so as to intersect the flow of the hydrocarbon stream in the inner conduit.

6. The apparatus as claimed in claim 1, wherein the second set of orifices direct the secondary dispersion stream so as to be tangential to an imaginary circle.

7. A method for mixing and atomizing a hydrocarbon stream using a dispersion stream, said method comprising:
   providing an apparatus comprising:
      an inner conduit having a first inlet for receiving the hydrocarbon stream and a second inlet for receiving a primary dispersion stream, the inner conduit producing a primary mixture comprising the hydrocarbon stream and the primary dispersion stream;
      said second inlet for receiving the primary dispersion stream including a first axial pipe and at least one further axial pipe connected in a direction of the flow of the primary dispersion stream, the first axial pipe being adapted to receive the primary dispersion stream and the second axial pipe defining a first set of orifices for exit of the primary dispersion stream thereto, the first set of orifices being located and directed towards the first inlet;
      an outer conduit having a third inlet for receiving a secondary dispersion stream, said inner and outer conduits together defining an annular passage for downstream flow of the secondary dispersion stream;
      a distal end of the annular passage defining a second set of orifices for allowing the secondary dispersion stream flowing there-through to come in contact with the primary mixture and to thereby form a secondary mixture;
      an outlet for dispensing the secondary mixture comprising the hydrocarbon stream, the primary dispersion stream and the secondary dispersion stream;
   introducing the hydrocarbon stream into the first inlet of the inner conduit;
   introducing the primary dispersion stream into the second inlet of the inner conduit; and
   introducing the secondary dispersion stream into the third inlet of the outer conduit.

\* \* \* \* \*